United States Patent
Bernards et al.

(10) Patent No.: US 9,938,911 B2
(45) Date of Patent: Apr. 10, 2018

(54) METHOD OF OPERATING AN INTERNAL COMBUSTION ENGINE WITH A TURBOCHARGER BASED ON CHANGE IN GAS FLOW QUANTITY OVER TIME

(71) Applicant: GM GLOBAL TECHNOLOGY OPERATIONS LLC, Detroit, MI (US)

(72) Inventors: Joerg Bernards, Katzenelnbogen (DE); Martin Miertschink, Ruesselsheim (DE)

(73) Assignee: GENERAL MOTORS LLC, Detroit, MI (US)

( * ) Notice: Subject to any disclaimer, the term of this patent is extended or adjusted under 35 U.S.C. 154(b) by 773 days.

(21) Appl. No.: 14/477,643

(22) Filed: Sep. 4, 2014

(65) Prior Publication Data

US 2015/0059714 A1     Mar. 5, 2015

(30) Foreign Application Priority Data

Sep. 5, 2013 (DE) .......... 10 2013 014 722

(51) Int. Cl.
| | |
|---|---|
| *F02D 41/00* | (2006.01) |
| *F02D 41/18* | (2006.01) |
| *F02B 37/18* | (2006.01) |
| *F02B 37/12* | (2006.01) |

(52) U.S. Cl.
CPC .......... *F02D 41/0007* (2013.01); *F02B 37/18* (2013.01); *F02B 2037/125* (2013.01); *F02D 41/18* (2013.01); *F02D 2200/0406* (2013.01); *F02D 2250/14* (2013.01); *Y02T 10/144* (2013.01)

(58) Field of Classification Search
CPC ........ F02B 37/12; F02B 37/16; F02B 37/168; F02B 37/18; F02B 37/183; F02B 2037/122; F02B 2037/125; F02B 2037/162; F02D 41/0007; F02D 41/14; F02D 41/1401; F02D 2041/1433; Y02T 10/144
See application file for complete search history.

(56) References Cited

U.S. PATENT DOCUMENTS

| | | | |
|---|---|---|---|
| 6,317,655 B1 * | 11/2001 | Khots | .................. F04D 27/001 700/275 |
| 8,387,384 B2 | 3/2013 | Quigley et al. | |
| 2007/0012040 A1 * | 1/2007 | Nitzke | ................ F02D 41/0007 60/605.2 |
| 2008/0148727 A1 * | 6/2008 | de Ojeda | .............. F02B 37/013 60/602 |

(Continued)

FOREIGN PATENT DOCUMENTS

| | | |
|---|---|---|
| CN | 1894492 A | 1/2007 |
| CN | 1900506 A | 1/2007 |

OTHER PUBLICATIONS

Chinese Patent Office, Search Report for Chinese Patent Application No. 201410445967.0, dated Sep. 22, 2017, 1 page.

*Primary Examiner* — Laert Dounis
(74) *Attorney, Agent, or Firm* — Lorenz & Kopf LLP

(57) ABSTRACT

The present disclosure relates to a method for operating an internal combustion engine for a motor vehicle, in particular a passenger car having a turbocharger with a compressor and a turbine. The method includes determining a change quantity of a gas flow quantity of a gas flow through the internal combustion engine and regulating the compressor based on this change quantity.

15 Claims, 1 Drawing Sheet

(56) References Cited

U.S. PATENT DOCUMENTS

| | | | |
|---|---|---|---|
| 2009/0077965 A1* | 3/2009 | Pursifull | F02B 37/007 60/602 |
| 2009/0082936 A1* | 3/2009 | Andreae | F02B 37/002 701/102 |
| 2009/0095255 A1* | 4/2009 | Boutonnet | B60W 10/02 123/350 |
| 2009/0211248 A1 | 8/2009 | Andreae et al. | |
| 2011/0036333 A1* | 2/2011 | Fontvieille | F02B 37/004 123/564 |
| 2011/0094220 A1* | 4/2011 | Geyer | F02B 37/16 60/602 |
| 2013/0289852 A1* | 10/2013 | Fontvieille | F02D 41/0002 701/108 |
| 2015/0047342 A1* | 2/2015 | McConville | F02B 47/08 60/600 |

* cited by examiner

`US 9,938,911 B2`

METHOD OF OPERATING AN INTERNAL COMBUSTION ENGINE WITH A TURBOCHARGER BASED ON CHANGE IN GAS FLOW QUANTITY OVER TIME

CROSS REFERENCE TO RELATED APPLICATION

This application claims priority to German Patent Application No. 102013014722.0 filed Sep. 5, 2013, which is incorporated herein by reference in its entirety.

TECHNICAL FIELD

The technical field relates to a method for operating an internal combustion engine with a turbocharger, a control means and a computer program product for carrying out the method and to a motor vehicle having such a control means.

BACKGROUND

Motor vehicle internal combustion engines with turbochargers include a compressor for the pressure charging of a gas flow in combustion chambers of the internal combustion engine. In the case of excessive pressure innovations or pressure conditions and/or insufficient gas flows, undesirable backflows against the conveying direction of the compressor can occur, the so-called surging.

For this reason, so-called steady surge limit lines are preset according to internal company practice which assign the current gas flows a maximum permissible pressure ratio each. The compressor is then controlled based on this steady surge limit line.

In the case of unsteady operation or a change of the gas flow, this is not optimal. If the gas flow diminishes, the compressor does not follow that immediately but owing to the mechanical inertia of the turbocharger, the inertia, in particular dead time, of its control and flow-mechanical inertias only with a delay. In the case of a diminishing gas flow this can thus lead to a pressure ratio on the compressor that is too high and consequently to undesirable surging.

If this is to be excluded, the surge limit line has to be restrictively preset accordingly. Because of this the efficiency of the compressor in steady operation deteriorates however. This is true more so in unsteady operation upon an increase of the gas flow in which the inertia explained above conversely delay an actually permissible pressure ratio increase and thus a more efficient operation of the compressor.

SUMMARY

An object of an embodiment of the present disclosure is to improve the operation of a motor vehicle. According to an aspect of the present disclosure, a motor vehicle, in particular a passenger car, includes an internal combustion engine with at least one turbocharger, which includes a compressor and a turbine which in particular is coupled to the compressor. The internal combustion engine can in particular be a spark-ignition or diesel engine.

According to an aspect of the present disclosure, a change quantity of a gas flow quantity of a gas flow of or through the internal combustion engine is determined and the compressor regulated based on this change quantity for operating the internal combustion engine.

In that the compressor is regulated based on the change of the gas flow, the inertias explained in the introduction can be taken into account in an embodiment. In particular, upon a diminishing gas flow a pressure ratio and/or a rotational speed of the compressor can be proactively reduced and the risk of surging reduced in this way. Equally, a pressure ratio and/or a rotational speed of the compressor can conversely be increased or be more closely brought up to a surge limit in steady operation since an interval to the surge limit no longer has to be preset subject to taking into account the inertia upon a diminishing gas flow and thus larger in quantity. In particular, upon an increase of the gas flow, a pressure ratio and/or a rotational speed of the compressor and thus its efficiency can be proactively increased since the risk of surging is already reduced here due to inertia.

In an embodiment, the gas flow through the internal combustion engine can be an air stream drawn in by the compressor, an air stream with or without fuel, which is fed to combustion chambers, in particular cylinders, of the internal combustion engine or a total or part exhaust gas stream out of the combustion chambers. In an embodiment, the gas flow size can describe as a volumetric flow or mass flow of the gas flow or as a through-flow volume or a through-flow mass of the gas flow per unit time, for example in $[m^3/s]$ or $[kg/s]$. In an embodiment, it can be a thermal, corrected and/or standardized gas flow quantity. In an embodiment, the change quantity can describe as a time change of the gas flow quantity. It can be a difference between two values of the gas flow quantity at different times. In an embodiment, the change quantity can be a difference quotient or differential quotient between two values of the gas flow quantity divided by the time interval of these times. In a further development, the change quantity can be determined via more than two times in order to advantageously obtain an averaged, in particular smoothed quantity.

In an embodiment, allocation of a current gas flow quantity to a control set point value is preset, in particular in the form of a characteristic diagram, a discrete or analytical relation, in particular function or the like. The allocation can be a surge limit curve which assigns the limit value, in particular for a pressure ratio $(p_2/p_1)$ for the compressor between an exit an entry pressure $p_2$ and $p_1$ respectively to different gas flow quantities, wherein the control set point value is determined or p in such a manner that the compressor awards this and/or does not exceed this pressure ratio. In an embodiment, the allocation, in particular a surge limit curve, for a steady operation of the compressor is preset based on simulations and/or tests.

In an embodiment of the present disclosure, the compressor can be controlled based on the change quantity in that a default set point pressure quantity of the compressor, in particular a set point pressure ratio is reduced when the gas flow through the combustion engine diminishes or the change quantity is smaller than a preset reference value, in particular smaller than 0. Additionally or alternatively, a default set point pressure quantity of the compressor, in particular a set point pressure ratio, can be increased as a function of the change quantity, in particular proportional to the same, when the gas flow through the internal combustion engine increases or the change quantity is greater than a preset reference value, in particular greater than 0. Additionally or alternatively, a default set point rotational speed quantity of the compressor can be reduced as a function of the change quantity, in particular proportional to the latter, when the gas flow through the internal combustion engine diminishes or the change quantity is smaller than a preset reference value, in particular smaller than 0 and/or as a function of the change quantity, in particular be enlarged in particular proportionally to the latter when the gas flow through the internal combustion engine increases or the change quantity is greater than a preset reference value, in particular greater than 0.

In an embodiment, a current gas flow quantity of the gas flow is determined, in particular through measurement and/or model-supported. Then, based on this current gas flow quantity and the change quantity, an estimated gas flow quantity of the gas flow is determined, in particular additively through the addition of a product of the change quantity with a preset period of the time to the current gas flow quantity. If the change quantity produces a reduction of the gas flow or is negative, the estimated gas flow quantity is correspondingly smaller than the current gas flow quantity, if the change quantity is positive, a larger estimated gas flow quantity is correspondingly obtained.

In a further development, the compressor is then controlled based on this estimated gas flow quantity based on a preset allocation of the current gas flow quantity to a control set point value, wherein instead of the current gas flow quantity the estimated gas flow quantity is used. Thus, in an embodiment, an allocation of a current gas flow quantity to a control set point value, in particular a steady surge limit line of the compressor, known per se, for example from the compressor manufacturer, can be utilized in a simple manner in that instead of the current the estimated or projected gas flow quantity is used or allocated.

In an embodiment, the estimated gas flow quantity can be determined based on an inertia quantity, which depends on a reaction inertia of the turbocharger, in particular a reaction inertia of an actuator of the turbocharger, a reaction inertia of the compressor and/or of the turbine, and/or a reaction inertia of the gas flow through the internal combustion engine. Because of this, the inertias explained at the outset in an embodiment can be taken into account particularly favorably in the estimation of the gas flow quantity or the projected control of the compressor. In an embodiment, the change quantity for this purpose is multiplied by a constant inertia quantity which depends on the reaction inertia of the turbocharger and/or the gas flow through the internal combustion engine, in particular is the greater the greater this inertia or time delay of a reaction to a change of the gas flow quantity is.

In an embodiment, the compressor can be controlled by adjusting a bypass line of the turbine, in particular of a so-called waste gate, and/or by adjusting a bypass valve of the compressor. Accordingly, a control set point value can include, in particular be in particular a position or an opening degree of such a valve. Additionally or alternatively, the compressor can be controlled by adjusting a blade arrangement of the turbine and/or by adjusting a blade arrangement of the compressor. Accordingly, a control set point value can include, in particular be in particular a position of such a blade arrangement.

According to an aspect of the present disclosure, a control means is equipped for operating an internal combustion engine including a turbocharger with a compressor and a turbine for carrying out one of the methods described here with respect to hardware and/or software. A means in terms of the present disclosure can be designed in terms of hardware and/or software, in particular digital processing such as microprocessor unit (CPU) and/or one or multiple programs or program modules which are preferentially data or signal-connected to a memory and/or BUS system. The CPU can be designed in order to execute commands which are implemented as a program stored in a storage system, to capture input signals from a data BUS and/or emit output signals to a data BUS. A storage system can include one or multiple, in particular different storage media, in particular optical, magnetic, solid-state and/or other non-volatile media. The program can be of such a type that it embodies or is capable of carrying out the methods described here so that the CPU can carry out the steps of such methods and thereby control the compressor in particular.

Accordingly, the control means in an embodiment includes a gas flow determining means for determining a gas flow quantity of a gas flow through the internal combustion engine. The gas flow determining means can in particular include one or multiple sensors for the direct or indirect capturing of the gas flow quantity, in particular pressure and/or temperature sensors.

In an embodiment, the control means includes a change determining means for determining a change quantity of the gas flow quantity determined by the gas flow determining means. The change determining means can in particular include a computation means for differentiating, in particular for storing and subtracting gas flow quantities at various times.

In an embodiment, the control means includes a regulating means for regulating the compressor based on this change quantity determined by the change determining means. The regulating means in an embodiment includes a comparison means for comparing a regulating set point value, which is preset based on the change quantity, and a corresponding captured actual value, and for outputting an adjusting value based on this comparison.

In an embodiment, the control means includes a current quantity determining means for determining a current gas flow quantity of the gas flow, and an estimated quantity determining means for determining an estimated gas flow quantity of the gas flow based on this current gas flow quantity determined by the current quantity determining means and the change quantity, wherein the regulating means is equipped for regulating the compressor based on this estimated gas flow quantity determined by the estimated quantity determining means.

In an embodiment, the turbocharger includes an adjustable bypass valve parallel to the turbine and/or an adjustable bypass valve parallel to the compressor, which can be regulated or is regulated through the control means. In addition or alternatively, the turbine and/or the compressor of the turbocharger can have an adjustable blade arrangement, the position of which can be regulated or is regulated through the control means.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Further-more, there is no intention to be bound by any theory presented in the preceding background or the following detailed description.

Figure 1:
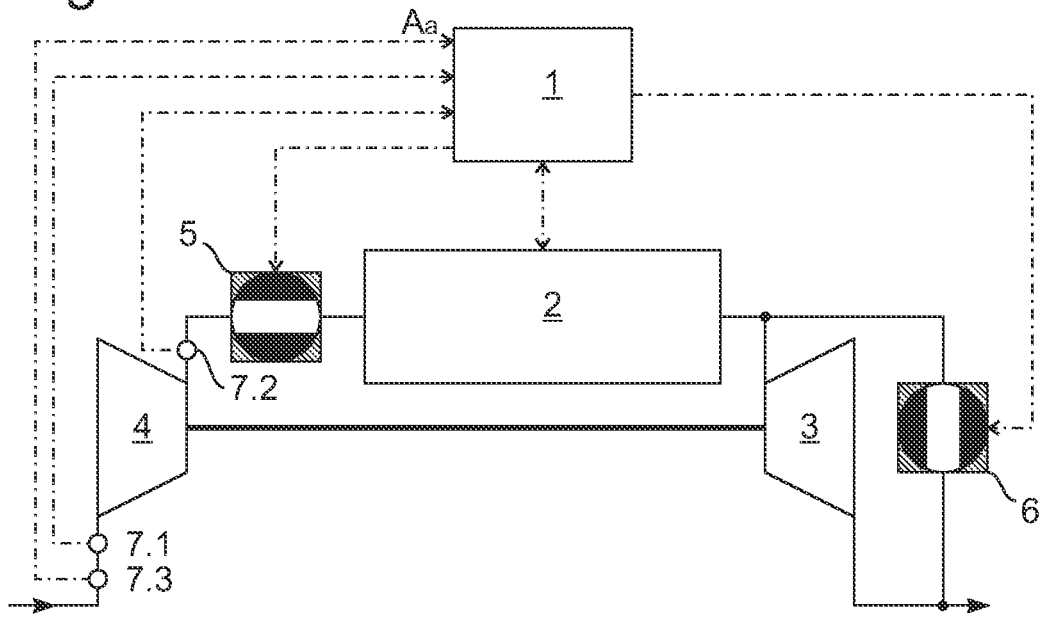
FIG. 1 shows an internal combustion engine of a motor vehicle with a control means according to an embodiment of the present disclosure.

FIG. 1 shows an internal combustion engine of a motor vehicle with a control means 1 according to an embodiment of the present disclosure.

The internal combustion engine includes combustion chambers 2 which are not shown in detail, in which an air-fuel mixture is combusted and in the process move a crankshaft via pistons for driving the motor vehicle.

The combustion chambers 2 are supplied with a gas flow in the form of air via a compressor 4 and a throttle valve 5. The compressor 4 is coupled via a shaft to a turbine 3 of a turbocharger, which is driven by exhaust gases from the combustion chambers 2.

The turbocharger can be regulated by the control means 1 in that the same as indicated in dash-dotted line in FIG. 1, activates a bypass valve 6 which is switched parallel to the turbine 3. The control means 1 also activates the throttle valve 5.

Sensors 7.1, 7.2 capture a pressure $p_1$ or $p_2$ of the gas flow before or after the compressor 4. From this the control means 1 determines a current pressure ratio $P=(p_2/p_1)$ of the compressor 4. A sensor 7.3 additionally captures a current gas flow quantity in the form of an air mass flow $A_a(t)$, likewise transmitting this to the control means 1, as indicated in dash-dotted line in FIG. 1.

Figure 2:
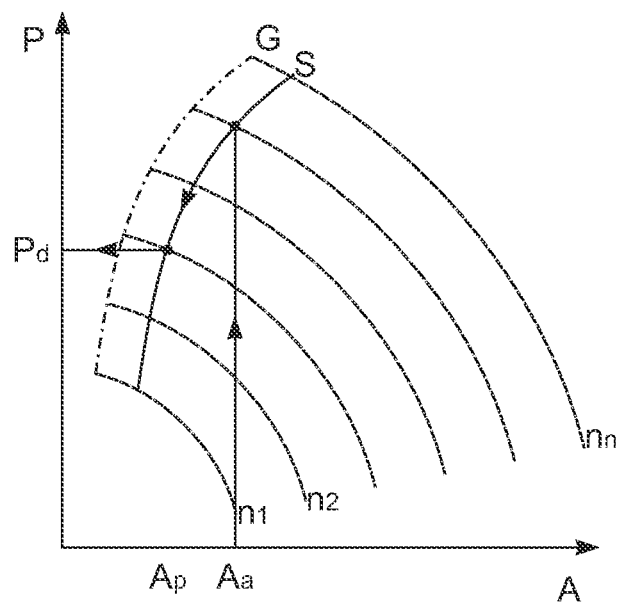
FIG. 2 shows an allocation of a gas flow quantity to a regulating set point value.

FIG. 2 shows an allocation of a gas flow quantity to a regulating set point value in the form of a compressor characteristic diagram for the compressor 4. The characteristic diagram is preset for the steady operation of the compressor 4. Here, various air-mass flow values or gas flow quantity A and rotational speeds $n_1$, $n_2$, ... $n_n$ are each allocated a pressure ratio P of the compressor 4.

In the left region of FIG. 2, a so-called surge limit G is shown in dash-dotted line, at which the compressor 4 in steady operation starts surging. This surge limit can for example be determined and preset in tests or through simulations by the manufacturer of the compressor. At a safety distance from this surge limit, a surge limit line S is preset which the compressor 4 should not exceed in steady operation.

Figure 3:
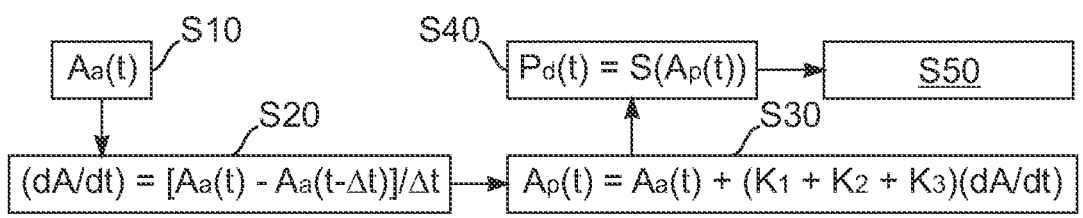
FIG. 3 shows a method for operating the internal combustion engine of FIG. 1 according to an embodiment of the present disclosure.

FIG. 3 shows a method for operating the internal combustion engine of FIG. 1 according to an embodiment of the present disclosure, which is carried out by the control means 1.

In a step S10, a current gas flow quantity of the gas flow in the form of a current air-mass flow $A_a(t)$ is determined for example periodically or continuously. From this, the control means 1 in a step S20 determines a change quantity (dA/dt) of this gas flow quantity $A_a(t)$, by subtracting two current gas flow quantities $A_a(t)$, $A_a(t-\Delta t)$ of different times t, t−Δt from one another, dividing them by their time interval Δt.

The control means 1 then determines in a step S30 an estimated gas flow quantity $A_p(t)$ of the gas flow based on this current gas flow quantity $A_a(t)$ and the change quantity (dA/dt). For this purpose, the change quantity (dA/dt) is multiplied by an inertia quantity $(K_1+K_2+K_3)$, wherein $K_1$ depends on a reaction inertia of the bypass valve 6 of the turbocharger, $K_2$ depends on a reaction inertia of the compressor 4 and $K_3$ depends on a reaction inertia of the gas flow through the internal combustion engine. Following this, this value $(K_1+K_2+K_3)\cdot(dA/dt)$ are added to the current gas flow quantity $A_a(t)$, which produces the estimated gas flow quantity $A_p(t)$, where $A_p(t)=A_a(t)+(K_1+K_2+K_3)\cdot(dA/dt)$.

The control means 1 then determines in a step S40 a set point pressure ratio $P_d(t)$ for the compressor 4 based on the preset steady surge limit curve S (see FIG. 2), where instead of the current gas flow quantity $A_a(t)$ the estimated gas flow quantity $A_p(t)$ is used: $P_d(t) = S(A_p(t))$. Following this, the control means 1 in a step S50 regulates the compressor 4 in such a manner that it tends towards the set point pressure ratio $P_d(t)$, for example in that the actual pressure ratio $P=(p_2/p_1)$ captured on the basis of the sensors 7.1, 7.2 and determined by the control means 1 is compared with the set point pressure ratio $P_d(t)$ and the bypass valve 6 is opened or closed proportionally to this difference, its time integral and/or its time derivation.

In this way, as indicated in FIG. 2, a set point pressure quantity of the compressor 4 in the form of a set point pressure ratio $P_d(t)$ is reduced when the gas flow through the internal combustion engine diminishes: starting out from a current gas flow quantity $A_a(t)$, it is not the latter but instead the estimated gas flow quantity $A_p(t)$ that is used in order to determine the set point pressure ratio $P_d(t)$.

The control means 1 is implemented in an ECU of the motor vehicle and includes a gas flow determining means for determining the gas flow quantity $A_a(t)$ based on captured values of the sensors 7.1, 7.2 and for carrying out the step S10, a current quantity determining means for determining the current gas flow quantity $A_a(t)$ based on captured values of the sensors 7 and a change determining means for determining the change quantity (dA/dt) based on these current gas flow quantities $A_a(t)$ and for carrying out the step S20, an estimated quantity determining means for determining the estimated gas flow quantity $A_p(t)$ and for carrying out the step S30 and a regulating means for regulating the compressor and for carrying out the steps S40, S50, which are not shown in all detail in FIG. 1.

Although in the preceding description exemplary embodiments were explained it was pointed out that a multitude of modifications is possible. It is additionally pointed out that the exemplary embodiments are merely examples which are not intended to restrict the scope of protection, the applications and the construction in any way. The person skilled in the art is rather provided with a guideline for implementing at least one exemplary embodiment through the preceding description, wherein various changes, in particular with respect to the function and arrangement of the described components can be carried out without leaving the scope of protection as obtained from the claims and feature combinations equivalent to these.

The invention claimed is:

1. A method for operating an internal combustion engine for a motor vehicle comprising:
    measuring a first gas flow quantity in a turbocharger at the start of a time interval with a sensor, wherein the turbocharger is operably coupled to the engine;
    measuring a second gas flow quantity in the turbocharger at the end of the time interval with the sensor, wherein the second gas flow quantity represents a current gas flow quantity;
    determining a gas flow rate as a function of the difference between the first gas flow quantity and the second gas flow quantity divided by the time interval;
    determining an estimated gas flow quantity based on the second gas flow quantity and the gas flow rate by multiplying the gas flow rate by an inertia quantity, the inertia quantity depending on reaction inertia of a bypass valve, reaction inertia of a compressor of the turbocharger, and reaction inertia of the internal combustion engine;
    determining a predetermined set point pressure ratio based on the estimated gas flow quantity; and regulating the turbocharger according to the predetermined set point pressure.

2. The method according to claim 1, wherein the estimated gas flow quantity is determined as a function of an inertia quantity representing a reaction inertia of the turbocharger, wherein the reaction inertia is selected from the group consisting of a reaction inertia of an actuator of the turbocharger, a reaction inertia of a compressor of the turbocharger, a reaction inertia of a turbine of the turbocharger, a reaction inertia of the gas flow through the turbocharger, and combinations thereof.

3. The method according to claim 2 further comprising regulating the compressor based on a preset allocation of the current gas flow quantity to a regulating set point value.

4. The method according to claim 3, wherein the preset allocation comprises a surge limit curve.

5. The method according to claim 1 further comprising:
reducing at least one of the set point pressure and a rotational speed quantity of a compressor of the turbocharger when the gas flow through the turbocharger is reduced; and
increasing at least one of the set point pressure and the rotational speed quantity of the compressor when the gas flow through the turbocharger is increased.

6. The method according to claim 1 further comprising regulating a compressor of the turbocharger by adjusting a bypass valve of at least one of the compressor and a turbine of the turbocharger.

7. The method according to claim 1 further comprising regulating a compressor of the turbocharger by adjusting a blade arrangement of at least one of the compressor and a turbine of the turbocharger.

8. The method according to claim 1, further comprising detecting an upstream pressure upstream of the compressor, detecting a downstream pressure downstream of the compressor, determining a measured pressure ratio of the downstream pressure to the upstream pressure, and comparing the predetermined set point pressure ratio to the measured pressure ratio; and
wherein regulating the turbocharger includes regulating the turbocharger according to the comparison of the predetermined set point pressure and the measured pressure ratio.

9. A control system for operating an internal combustion engine for a motor vehicle comprising:
a gas flow sensor configured to measure a first gas flow quantity through a turbocharger at a start of a time interval and a second gas flow quantity through the turbocharger at an end of the time interval;
a controller operably coupled to the gas flow sensor and configured to determine a gas flow rate over the time interval as a function of the difference between the first gas flow quantity and the second gas flow quantity divided by the time interval, the controller configured to determine an estimated gas flow quantity based on the second gas flow quantity and the gas flow rate by multiplying the gas flow rate by an inertia quantity, the inertia quantity depending on reaction inertia of a bypass valve, reaction inertia of a compressor of the turbocharger, and reaction inertia of the internal combustion engine, the controller configured to determine a predetermined set point pressure ratio based on the estimated gas flow quantity; and
a regulator operably coupled to the turbocharger and configured to regulate the turbocharger according to the predetermined set point pressure.

10. The control system according to claim 9 wherein the regulator is configured to regulate an adjustable bypass valve parallel to a turbine in the turbocharger.

11. The control system according to claim 9 wherein the regulator is configured to regulate an adjustable bypass valve parallel to a compressor in the turbocharger.

12. The control system according to claim 9 wherein the regulator is configured to regulate an adjustable blade arrangement of a turbine in the turbocharger.

13. The control system according to claim 9 wherein the regulator is configured to regulate an adjustable blade arrangement of a compressor in the turbocharger.

14. The control system of claim 9, wherein the controller is configured to detect an upstream pressure upstream of the compressor, detect a downstream pressure downstream of the compressor, determine a measured pressure ratio of the downstream pressure to the upstream pressure, and compare the predetermined set point pressure ratio to the measured pressure ratio; and
wherein the regulator is configured to regulate the turbocharger according to the comparison of the predetermined set point pressure and the measured pressure ratio.

15. A motor vehicle comprising:
an internal combustion engine;
a turbocharger with a compressor and a turbine;
a bypass valve;
a first pressure sensor configured to detect an upstream pressure that is upstream of the compressor;
a second pressure sensor configured to detect a downstream pressure that is downstream of the compressor;
a gas flow sensor configured to measure a first gas flow quantity through the turbocharger at a start of a time interval and a second gas flow quantity through the turbocharger at an end of the time interval;
a controller operably coupled to the first pressure sensor, the second pressure sensor, and the gas flow sensor, the controller being configured to:
determine a gas flow rate over the time interval as a function of the difference between the first gas flow quantity and the second gas flow quantity divided by the time interval;
determine an estimated gas flow quantity based on the second gas flow quantity and the gas flow rate by multiplying the gas flow rate by an inertia quantity, the inertia quantity depending on reaction inertia of the bypass valve, reaction inertia of the compressor, and reaction inertia of the internal combustion engine;
determine a predetermined set point pressure ratio based on the estimated gas flow quantity;
determine a measured pressure ratio of the downstream pressure to the upstream pressure;
compare the predetermined set point pressure ratio to the measured pressure ratio; and
a regulator operably coupled to the turbocharger and configured to regulate the turbocharger according to the comparison of the predetermined set point pressure ratio and the measured pressure ratio.

* * * * *